US010776613B1

(12) United States Patent
Schneider et al.

(10) Patent No.: US 10,776,613 B1
(45) Date of Patent: Sep. 15, 2020

(54) FACIAL RECOGNITION SYSTEM AND METHODS FOR IDENTITY CREDENTIALING AND PERSONALIZED SERVICES

(71) Applicant: Royal Caribbean Cruises Ltd., Miami, FL (US)

(72) Inventors: Jay Schneider, Miami Beach, FL (US); Joey Hasty, Miami, FL (US); Gregory Morwick, Miami, FL (US); Timothy Klauda, Miami Shores, FL (US); Eunha Kim, Miami, FL (US); Alastair R. Partington, Minnetonka, MN (US); Joseph J. Pritikin, Portola Valley, CA (US); Daniel E. Potter, San Jose, CA (US); Keith W. Hartman, Redwood City, CA (US); Kevin R. Strouse, Langhorne, PA (US)

(73) Assignees: Royal Caribbean Cruises Ltd., Miami, FL (US); Tascent, Inc., Los Gatos, CA (US)

( * ) Notice: Subject to any disclaimer, the term of this patent is extended or adjusted under 35 U.S.C. 154(b) by 0 days.

(21) Appl. No.: 16/570,544

(22) Filed: Sep. 13, 2019

(51) Int. Cl.
*G06K 9/00* (2006.01)
*G06Q 10/08* (2012.01)
*G06Q 50/30* (2012.01)
*G07C 9/00* (2020.01)

(52) U.S. Cl.
CPC ..... *G06K 9/00288* (2013.01); *G06Q 10/0832* (2013.01); *G06Q 50/30* (2013.01); *G07C 9/00563* (2013.01); *G06Q 2240/00* (2013.01)

(58) Field of Classification Search
CPC .......... G06K 9/00288; G06Q 10/0832; G06Q 50/30; G06Q 2240/00; G07C 9/00563
See application file for complete search history.

(56) References Cited

U.S. PATENT DOCUMENTS

| 6,111,517 A * | 8/2000 | Atick ................. G06K 9/00288 340/5.83 |
| 6,526,158 B1 * | 2/2003 | Goldberg ........... H04N 1/00151 382/115 |
| 6,801,907 B1 * | 10/2004 | Zagami .................. G07C 9/253 |
| 6,985,070 B1 * | 1/2006 | Parker ..................... G07C 9/38 340/5.33 |

(Continued)

*Primary Examiner* — Xuemei G Chen
(74) *Attorney, Agent, or Firm* — Knobbe, Martens, Olson & Bear, LLP

(57) ABSTRACT

Systems and methods are provided for identifying customers aboard a cruise ship for provision of products and location access and for embarkation or disembarkation. Systems can include a data store on the cruise ship storing customer profiles of customers, a plurality of networked computing devices including image capture devices, and a processor in communication with the data store and the networked computing devices. The processor receives access requests in conjunction with images of the requestors, uses facial recognition software algorithms to identify the requestor as a customer entitled to the requested access, based on facial recognition data stored for the customer, and causes access to be granted to the customer. Confidence levels of facial recognition results may be improved by combining initial facial recognition results with additional cruise-specific information associated with customers.

29 Claims, 3 Drawing Sheets

(56) References Cited

U.S. PATENT DOCUMENTS

| | | | | |
|---|---|---|---|---|
| 8,425,313 | B2* | 4/2013 | Nelson | G06Q 30/02 463/29 |
| 9,270,840 | B2* | 2/2016 | David | G06K 9/00288 |
| 10,275,587 | B2* | 4/2019 | Cornick | G07C 9/28 |
| 10,380,816 | B2* | 8/2019 | Landers, Jr. | G06K 9/6267 |
| 10,505,756 | B2* | 12/2019 | Park | G06F 16/9024 |
| 2004/0098276 | A1* | 5/2004 | Blazey | G06Q 10/08 235/376 |
| 2005/0219360 | A1* | 10/2005 | Cusack | G07C 9/257 348/156 |
| 2009/0157515 | A1* | 6/2009 | Lafauci | G06Q 10/06 705/15 |
| 2010/0078475 | A1* | 4/2010 | Lin | G06Q 50/14 235/380 |
| 2011/0209192 | A1* | 8/2011 | LeClerc Greer | G06F 21/32 726/1 |
| 2012/0316995 | A1* | 12/2012 | Davies | G06Q 30/0621 705/26.81 |
| 2013/0097038 | A1* | 4/2013 | Potter | G06Q 30/00 705/21 |
| 2013/0322707 | A1* | 12/2013 | Phillips | H04N 1/00196 382/118 |
| 2014/0063191 | A1* | 3/2014 | Bataller | G08B 13/22 348/46 |
| 2014/0105466 | A1* | 4/2014 | Botes | G06K 9/00221 382/118 |
| 2014/0168477 | A1* | 6/2014 | David | G06Q 30/0601 348/240.2 |
| 2016/0239733 | A1* | 8/2016 | Hertz | G06F 16/29 |
| 2018/0121936 | A1* | 5/2018 | Madduri | G06Q 30/0201 |
| 2018/0338241 | A1* | 11/2018 | Li | H04L 67/12 |
| 2019/0028290 | A1* | 1/2019 | Jeong | H04L 12/2816 |
| 2019/0050837 | A1* | 2/2019 | Della Corte | G06F 21/629 |
| 2019/0122250 | A1* | 4/2019 | Panigrahi | G06F 16/9035 |
| 2019/0251334 | A1* | 8/2019 | Kawase | G06K 9/00268 |
| 2019/0272413 | A1* | 9/2019 | Eder | H04N 5/23293 |
| 2019/0354763 | A1* | 11/2019 | Stojancic | G06K 9/00744 |
| 2019/0362169 | A1* | 11/2019 | Lin | G06K 9/00892 |

* cited by examiner

FACIAL RECOGNITION SYSTEM AND METHODS FOR IDENTITY CREDENTIALING AND PERSONALIZED SERVICES

BACKGROUND

Technological Field

The present application relates to facial recognition-based services for customers of a service provider, such as but not limited to a cruise operator or other hospitality or entertainment provider. In particular, the present application relates to systems and methods for identity verification and provision of services based on facial recognition.

Description of the Related Art

Cruise ships are often described as floating cities. These ships are designed to provide every convenience and necessity to hundreds and in many cases thousands of passengers, while keeping the passengers entertained during a sailing that can range from 2 days to as many as 4 weeks. Passengers must be able to access secured accommodations such as staterooms. Furthermore, with respect to entertainment, the passengers are often given various options for activities to fill the time on the cruise. These activities may include on-ship options, such as movies, live shows, and meals, or shore activities (including shore excursions) when the cruise ship is in a port along a voyage route. It is desirable to provide connected services and experiences including convenient access to accommodations, entertainment, food, beverages, and the like.

SUMMARY

The system, method, and devices of this disclosure each have several innovative aspects, no single one of which is solely responsible for its desirable attributes disclosed herein. Without limiting the scope of this disclosure, its more prominent features will now be discussed briefly. After considering this discussion, and particularly after reading the section entitled "Detailed Description" one will understand how the features of this disclosure provide advantages over other personalized recommendation solutions.

In a first aspect, a system for access control on a cruise ship comprises a data store on the cruise ship having stored thereon a plurality of customer profiles associated with individual customers embarked on the cruise ship, the data store in communication with a ship-based network; a plurality of networked computing devices located at least partially in public areas of the cruise ship, each of the networked computing devices comprising an image capture device and a networking device configured to communicate with the ship-based network; a processor in communication with the data store and the plurality of networked computing devices; and a stateroom access control system disposed within or proximate to a door of a stateroom of the cruise ship. The processor is configured to receive, from a first device of the plurality of networked computing devices, a first request for access to a product or location associated with at least a first customer; receive, from the first device, an image of a requestor associated with the request; generate, based on one or more facial recognition software algorithms and preexisting facial recognition data associated with the first customer stored in the data store, a facial recognition result indicating that the image of the requestor is an image of the first customer; and cause access to the product or location to be granted to the first customer, based at least in part on the facial recognition result. The stateroom access control system comprises an electronic door lock configured to unlock the door based on receiving a digital key via an electronic lock network connection; a local data store having stored thereon at least a portion of one or more profiles of the plurality of customer profiles, the one or more profiles associated with customers permitted to access the stateroom; a wide angle camera configured to image a public area of the cruise ship adjacent to the door of the stateroom; a local power supply configured to provide electrical power to the stateroom access control system in the event of an interruption of ship power; and a local processor in communication with the local data store and the wide angle camera. The local processor is configured to receive, from the wide angle camera, an image of a face of a person disposed within the public area; locally generate, based on one or more facial recognition software algorithms and the at least a portion of the one or more profiles, a facial recognition result indicating that the person is one of the customers permitted to access the stateroom; and cause transmission of the digital key to the electronic door lock in response to the facial recognition result.

In some embodiments, the local processor is further configured to receive, from the data store, at least a portion of one or more additional profiles of the plurality of customer profiles, the one or more additional profiles associated with additional customers subsequently permitted to access the stateroom; cause the at least a portion of the one or more additional profiles to be stored in the local data store; and locally generate at least one subsequent facial recognition result based at least in part on the at least a portion of the one or more additional profiles. In some embodiments, the local processor is further configured to receive a communication indicating that access privileges are revoked for a first customer of the customers permitted to access the stateroom; and cause the at least a portion of the profile associated with the first customer to be removed from the local data store. In some embodiments, the digital key is stored within a key database remote from the stateroom access control system, and causing transmission of the digital key comprises causing the digital key to be transmitted from the key database to the electronic door lock.

In a second aspect, a system for identifying customers embarked on a cruise ship comprises a data store on the cruise ship having stored thereon a plurality of customer profiles associated with individual customers embarked on the cruise ship, the data store in communication with a ship-based network; a plurality of networked computing devices located at least partially in public areas of the cruise ship, each of the networked computing devices comprising an image capture device and a networking device configured to communicate with the ship-based network; and a processor in communication with the data store and the plurality of networked computing devices. The processor is configured to receive, from a first device of the plurality of networked computing devices, a first request for access to a product or location associated with at least a first customer; receive, from the first device, an image of a requestor associated with the request; generate, based on one or more facial recognition software algorithms and preexisting facial recognition data associated with the first customer stored in the data store, a facial recognition result indicating that the image of the requestor is an image of the first customer; and cause access to the product or location to be granted to the first customer, based at least in part on the facial recognition result.

In some embodiments, the facial recognition result further includes a result strength value indicative of a confidence level of the facial recognition result, and the processor causes access to be granted to the product or location based at least in part on the result strength value exceeding a predetermined threshold. In some embodiments, the processor is configured to select the predetermined threshold from at least a first predetermined threshold and a second predetermined threshold higher than the first predetermined threshold, and the processor is configured to select the second predetermined threshold when the request is a request to enter a stateroom. In some embodiments, the processor is further configured to adjust the result strength value based on one or more other information items stored in the data store in association with the first customer. In some embodiments, the one or more other information items comprise one or more of other customers associated with the first customer, itinerary information, one or more previous facial recognition results, a predicted location, or a detection of a user device of the first customer near the requestor's location. In some embodiments, the first device comprises a video capture device, and wherein the first device is configured to capture a video of the requestor and to send the video to the processor. In some embodiments, the processor is configured to isolate a frame of the video for facial recognition, and the image of the requestor comprises the isolated frame of the video. In some embodiments, access to the product or location is granted based at least in part on a customer profile stored in the data store and associated with the first customer. In some embodiments, the customer profile is selected from a plurality of stored customer profiles based on the facial recognition result. In some embodiments, the processor is further configured to determine, based on the customer profile, that the first customer is entitled to access to the requested product or location. In some embodiments, the request is a request for a product, and wherein the processor is further configured to determine, based on the customer profile, that the first customer has not paid for the product; bill the first customer for a price of the product; and cause access to the product to be granted to the first customer. In some embodiments, the product comprises at least one of a ship-based entertainment or dining event, a shore excursion, a food or beverage item, and a retail item. In some embodiments, the system further comprises a plurality of passive monitoring devices located at least partially in public areas of the cruise ship, each of the passive monitoring devices comprising an image capture device and a networking device configured to communicate with the ship-based network, wherein the processor is further configured to receive, from the plurality of passive monitoring devices, images captured by the image capture devices of the passive monitoring devices; detect, based on the one or more facial recognition software algorithms and the preexisting facial recognition data, one or more second customers in the images received from the plurality of passive monitoring devices; and update, in the data store, location tracking information associated with the one or more second customers.

In a third aspect, a facial recognition-based embarkation and disembarkation system for a cruise ship comprises a data store on the cruise ship having stored thereon a plurality of customer profiles associated with individual customers expected to embark on the cruise ship, the data store in communication with a ship-based network; an embarkation device in communication with the data store, the embarkation device comprising an image capture device and a networking device configured to communicate with the ship-based network; and a processor in communication with the data store and the embarkation device. The processor is configured to receive, from the embarkation device, an image and an identifier of a first customer expected to embark on the cruise ship; establish, in a customer profile of the plurality of customer profiles associated with the first customer, facial recognition data associated with the first customer, the facial recognition data comprising at least the image; record, in the customer profile, a confirmation of embarkation of the first customer; generate, based on one or more facial recognition software algorithms and the facial recognition data, facial recognition results indicating that an image received from a networked computing device on the cruise ship is an image of the first customer; and cause one or more products to be provided to the first customer based at least in part on the facial recognition results.

In some embodiments, the plurality of customer profiles associated with individual customers are developed based on information provided by individual customers at a time of booking a sailing on the cruise ship, while developing a cruise itinerary for the sailing, and/or during a prior sailing on which the individual customer embarked. In some embodiments, the one or more products comprise at least one of ship-based activities, shore-based activities, food or beverage items, or retail items. In some embodiments, the one or more products include at least a ship-based activity comprising an entertainment event or a dining event. In some embodiments, the one or more products include at least a shore excursion. In some embodiments, the processor is further configured provide access to a stateroom associated with the first customer based at least in part on the facial recognition results. In some embodiments, the processor is further configured to record one or more subsequent departure or return events associated with the first customer based at least in part on the facial recognition results. In some embodiments, the processor is further configured to receive, from the first customer, a request for an item to be delivered to the customer while the customer is aboard the cruise ship; and provide, to a crew member delivering the requested item, one or more visual notifications on a crew device in the possession of the crew member while the crew member is traveling to the first customer, wherein the one or more visual notifications are based at least in part on at least some of the facial recognition results and facilitate delivery of the item to the customer. In some embodiments, the one or more products comprise an activity requiring the customer to provide an acknowledgement of risk prior to participation, and causing the one or more products to be provided comprises at least receiving a video of the first customer speaking a risk acknowledgement statement; verifying the identity of the first customer based on one or more image frames of the video; and causing the first customer to be permitted to participate in the activity based on the verification of the identity of the first customer. In some embodiments, each of the facial recognition results further include a result strength value indicative of a confidence level of the facial recognition result. In some embodiments, the processor causes the one or more products to be provided based at least in part on the result strength value exceeding a predetermined threshold. In some embodiments, the processor is further configured to adjust the result strength value based on one or more other information items stored in the data store in association with the first customer. In some embodiments, the one or more other information items comprise one or more of other customers associated with the first customer, itinerary information, one or more previous facial recognition results, a predicted location, or a detection of a user device of the first customer.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Figure 1:
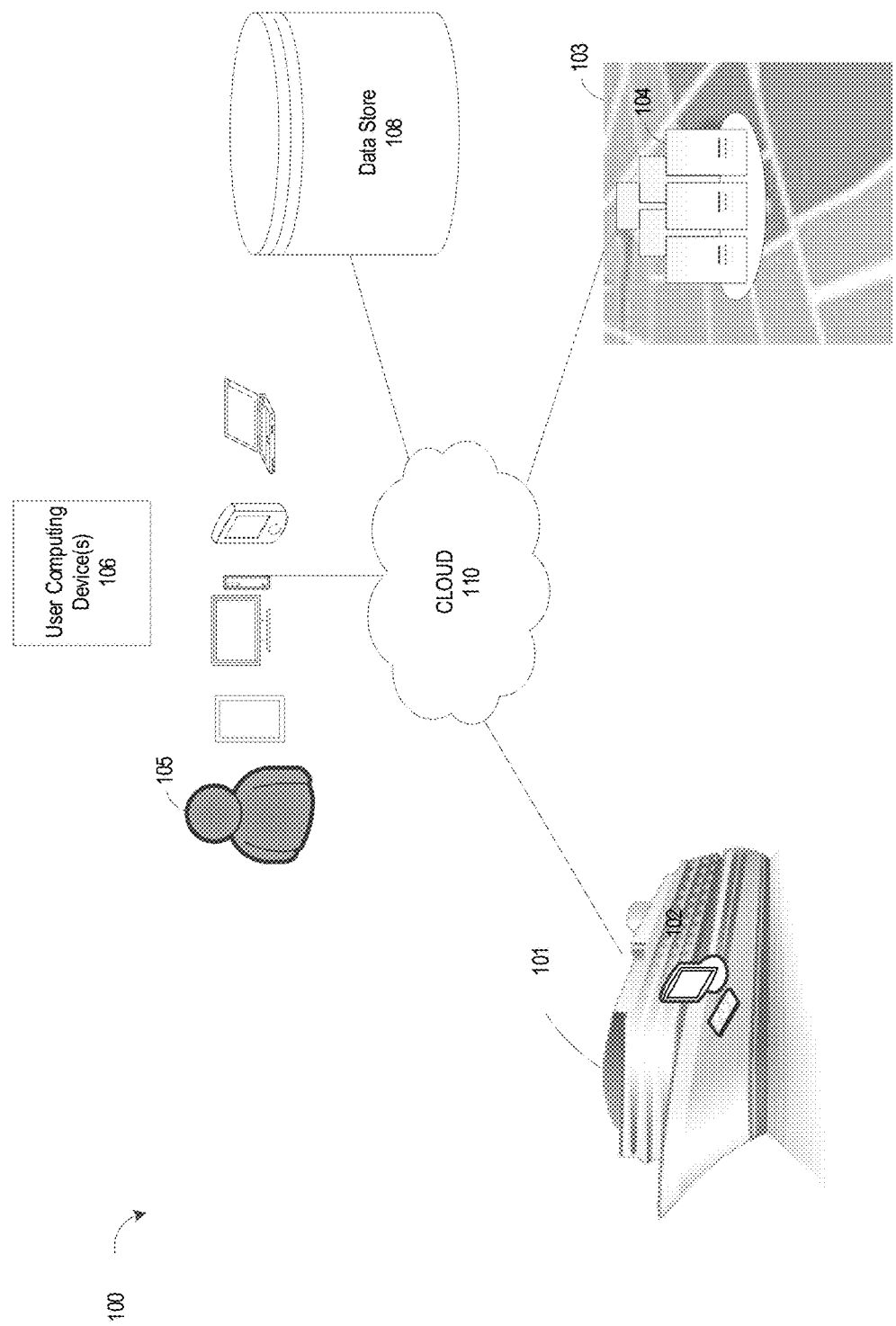
FIG. 1 shows a diagram of a networked computing system comprising a ship-based computing system and a shore-based computing system, according to an exemplary embodiment.

Customers aboard cruises or other voyages frequently use identity credentials to gain access to a variety of products, services, locations, and the like. For example, a customer may typically be issued an identity credential such as an identification card, which may include an RFID tag, machine readable code, or magnetic strip containing identifying information. The customer can use the identity credential to access the customer's stateroom or other accommodation, to gain entry to restaurants or bars, to access various onboard events or activities, to purchase items, and/or to disembark or access shore excursions or the like. Identification cards may be cumbersome, for example, because they may take time to produce at the beginning of a voyage, increasing embarkation time. In addition, identification cards may be lost, requiring additional time to be spent obtaining a replacement. It is desirable to replace existing card-based onboard identification systems with passive identification methods that do not require customers to carry an identity credential. However, conventional facial recognition software may not be reliable enough to entirely replace identity credentials.

Advantageously, the facial recognition services and systems described herein utilize unique aspects of computing systems integrated within a ship or a cruise operator's fleet to enhance the reliability of facial recognition systems. As will be described in greater detail, confidence level enhancement of facial recognition results based on association with additional data may advantageously allow the facial recognition services and systems described herein to more reliably achieve facial recognition results with sufficient confidence levels to replace other forms of identity credentialing. Moreover, the services and systems of the present technology may utilize additional available information, such as a known set of passengers, known or observed interpersonal connections, known itineraries, ongoing data capture, or the like, to further improve confidence levels associated with detection events. A cruise event is uniquely suited to enhance the reliability of facial recognition services and systems, as a cruise has a consistent set of customers throughout the duration of the cruise, the set of customers is limited to the capacity of a cruise ship (e.g., between approximately 1000 and 10000 customers), and customers embarking on a cruise experience are likely to expect and adhere to a requirement of having a photo taken prior to beginning the cruise experience for initial data capture.

Facial recognition services and systems of the present technology are uniquely suited to provide seamless access and seamless entry with reduced delay or no delay in the ecosystem for guest experiences around a cruise ship, because a cruise ship is a controlled environment in which initial data capture of facial recognition data is relatively easy to accomplish at the time of embarkation. In one example, an expedited arrival process may be implemented such that a customer embarking need only present an identification (e.g., a driver's license or passport) and have one or more photos taken, without requiring additional time for producing a new identity credential or other embarkation procedures. Accordingly, customers may be able to take advantage of their vacations more quickly as the time spent embarking on a cruise ship may be substantially reduced in accordance with the facial recognition services and systems of the present technology to provide a frictionless transfer from land to ship. In addition, the present technology may reduce the time and hassle required for individual interactions during a cruise (e.g., entering events or activities, purchasing items, or the like) and may reduce the amount of time during the cruise spent stopping, waiting, or searching in a pocket, backpack, or purse for an identity card or other credential, and may accordingly increase the amount of time spent on desirable activities.

Although embodiments of the facial recognition services and systems described herein are described in the context of providing access, goods, and/or services to customers of a cruise operator, it will be understood that the present technology is not limited to this class of customer, this type of service provider, or the particular cruise context. As will be described in detail below, features of the present technology can be employed in many other contexts, such as but not limited to entertainment, hotel, and other hospitality services and systems; banking and other financial services and systems; healthcare services and systems; and health information technology (HIT) services and systems. The present technology can be implemented in any system where it is desirable to implement facial recognition technology instead of or in addition to existing physical identity credentials.

Customers of facial recognition services and systems described herein can be passengers on a cruise or similar voyage or transport, guests at a hotel or similar destination, or patrons at a retreat or similar event. The operators of the cruise, hotel, and retreat services may offer a variety of items or experiences customers may purchase or participate in. In order to improve ease of customer access to accommodations, selected activities, food, beverages, and the like, the operators may use a computing and/or database system that includes a system of touchpoints throughout the cruise, hotel, or retreat location. Touchpoints are configured to recognize individual customers based on facial recognition data and/or historical information acquired about a plurality of customers, including the specific customer.

Exemplary Term Descriptions

To facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary definitions.

Data Store: Includes any computer readable storage medium and/or device (or collection of data storage mediums and/or devices) that stores data. Examples of data stores include, but are not limited to, optical disks (for example, CD-ROM, DVD-ROM, and so forth), magnetic disks (for example, hard disks, floppy disks, and so forth), memory circuits (for example, solid state drives, random-access memory ("RAM"), and so forth), and/or the like. Another example of a data store is a hosted storage environment that includes a collection of physical data storage devices that may be remotely accessible and may be rapidly provisioned as needed (commonly referred to as "cloud" storage). Any data store as described herein may be or include a single storage medium and/or device, or may be distributed among a plurality of data storage mediums and/or device located locally or remotely.

Customer: Depending on the context, "customer" may refer to a person, such as an individual, consumer, or user that interacts with services and systems described herein. A customer can include any entity that accesses the services of a service provider, such as but not limited to a cruise ship passenger, a guest services attendant, a food and beverage attendant, and a cashier. The terms "user," "individual," "consumer," "guest," "passenger," and "customer" can be interpreted to include single persons, as well as groups of users, such as, for example, married couples or domestic partners, organizations, groups, and business entities. These terms may be used interchangeably. In some embodiments, the terms refer to a computing device of a user rather than, or in addition to, an actual human operator of the computing device.

Identifier: Depending on the context, "identifier" may refer to a data item uniquely identifying a customer, a crew member, a ship, a product, a location, a stateroom, an item, a touchpoint or other connected device, or the like. In various embodiments, an identifier may comprise a set of alphanumeric characters stored, for example, in a data store. In one example, each customer may have a corresponding customer profile stored in a data store at a ship-based data center. The customer profile may include an alphanumeric customer identifier stored in association with one or more other information items, such as a stateroom identifier, identifiers of other known travel party members, identifiers of purchased products or itinerary items, etc. The term "identifier" as used herein may refer to a set of characters and/or one or more physical bits of a non-transitory computer readable medium having the set of characters stored thereon.

A facial recognition result encompasses information produced by a facial recognition system based on one or more captured images of a person. For example, a facial recognition result may include an identifier of an individual customer determined from the one or more captured images based on a collection of data associated with the customer and through application of a machine learning process comparing that data with other data (e.g., data of a plurality of other customers). In some implementations, the facial recognition result may include a result strength. The strength may indicate a confidence level in the facial recognition result identified by a computing system. For example, the strength may include a numerical value (e.g., a value between 0 and 1) indicative of computing system's confidence level in the accuracy of the facial recognition result. As such, the strength may be included to allow systems receiving the recommendation to decide how much weight or credence to give the facial recognition result. As will be described in greater detail, certain access-granting touchpoints may require relatively higher confidence levels in facial recognition results as a condition of granting access depending on individual requirements of the touchpoint locations.

Facial Recognition Services and Systems of the Present Technology

The cruise industry is experiencing a boom that is posed to continue, with two dozen new ships scheduled to debut and over 30 million passengers expected to consume cruise services in 2019. The numbers of passengers booking cruises has steadily increased over the past decade, and continued growth is expected into the foreseeable future. As the number of passengers participating in such trips continues to grow, transit providers (for example, companies that provide and/or coordinate these trips, such as but not limited to cruise operators and travel planning services) are looking for ways to provide additional benefits and value to prospective and existing passengers on the trips that they schedule, operate, and/or coordinate. Often, providing such benefits and value may include coordinating and offering various experiences, items, activities, entertainment and dining options, and events (collectively referenced herein as "products") that the customers can engage or participate in during a scheduled voyage of a cruise ship (hereinafter "sailing"). Customer experiences in taking advantages of such products, as well as in all aspects of a cruise experience, may be enhanced by simplifying and/or streamlining customers' access to products, accommodations, dining, and the like.

In implementations of the present technology, individual customers may have one or more photos taken at an embarkation device to develop facial recognition data including an initial set of features for identification. Subsequent interactions with touchpoints, cameras, and other devices during the cruise may yield additional image data which can be used to augment the initial facial recognition data, such that the customers can be identified with a greater confidence level in future interactions. In some cases, facial recognition data for a customer may be retained after the conclusion of a cruise and may be used as initial facial recognition data for the customer when the customer returns for a subsequent cruise. Thus, implementations of the facial recognition services and systems described herein are advantageously optimized for the entire customer lifecycle of the cruise experience—from initial data capture at embarkation, to a passenger that is currently engaged in the cruise experience in real-time, to returning customers who have traveled on a previous cruise of the cruise operator. The following embodiments are provided to illustrate examples of these optimized interactions, and are not intended to limit the scope of the present technology.

In some embodiments, facial recognition service and systems may further take advantage of a data store including customer information associated with customers that are on board a particular cruise. The data store of customer information may be populated based, at least in part, on information from a profile unique to each customer, corresponding travel information for each customer and/or additional customers known to be traveling with each customer, historical product selection/purchase information for each customer, and/or social media data of each customer. In some embodiments, the corresponding travel information and the historical product information are stored in association with the unique customer profile. The customer profile can store any suitable information specific to the customer, including but not limited to loyalty tier, loyalty preference, and certain types of demographic information. The profile can be stored in the data store of historical customer information. Further details of example implementations of facial recognition services and systems and methods of the present technology are provided below.

Example Computing Systems for Facial Recognition in Accordance with the Present Technology FIG. 1 illustrates a diagram of an example networked computing system 100 for facial recognition services and systems described herein. The system 100 includes a ship-based computing system 102 which may be in communication with a shore-based computing system 104 via a cloud-based or wireless network 110, according to this exemplary embodiment. In some embodiments, the ship-based computing system 102 is located on a ship 101 (or other mass transport, such as a train, a shuttle, a bus, a plane, and so forth) configured to transport a plurality of individuals or customers ("customers") during a trip or voyage ("sailing"). The shore-based computing system 104 is located in a shore-based facility 103 and is associated with a service provider, such as a company or entity that operates the ship 101. Alternatively, or additionally, the shore-based computing system 104 may include a cloud-based database or data store 108 with which the ship-based computer system 102 communicates at least periodically while in port or at sea. Alternatively or in addition, the shore-based computing system 104 may include a cloud-based computing system with which the ship-based computer system 102 communicates at least periodically.

The system 100 may also include a plurality of user computing devices 106 that are operated by customers of the service provider. The user computing devices 106 may include any one of a smartphone, a tablet, a laptop, a desktop, a personal digital assistant (PDA), a vehicle communication system, a smartwatch, or any other electronic device. The user computing device 106 allows a user 105 (for example, the customer, as described above) to request products such as experiences, items, activities, entertainment and dining options, and events (collectively referred to herein as "products") before or while the customer 105 is embarked on the ship 101 during a sailing. In some embodiments, communications between the ship-based computing system 102 and the shore-based computing system 104 are used to provide information to the ship-based computing system 102 regarding facial recognition profiles, as well as customer information that may be stored at the shore-based computing system 104 and/or the data store 108. Any suitable communications arrangement can be implemented in embodiments of the present technology.

In some embodiments, the ship 101 transports the plurality of customers over a period of time (for example, for a duration of the sailing). At various times prior to and during the sailing, the customers on the ship 101 review various products offered onboard the ship as well as during port visits, and potentially book, reserve, purchase, or add one or more products to the customer's cruise itinerary. As described above, such products can include items, admission to an event or an experience such as a performance or shore excursions, entertainment options, specialty dining packages, and menu items, just to name a few. Shipboard events and experiences can include, for example, spa services, classes, childcare services, live performances, movie showings, organized sports activities and contests, dining experiences, activities with limited time slots and/or specific restrictions (such as wakeboarding, bungee jumping, rock climbing, etc.). It will be understood that shipboard events and experiences also include events for which no reservation or booking is required for a customer to participate, for example welcome parties, informational presentations for port calls, and walk-in dining experiences.

Items can include, for example, retail items sold in the ship's store, items sold during performances, items sold by the service provider ashore during port visits, or any other item a customer may evaluate and purchase during the customer's cruise lifecycle. It will be understood that items can include intangible items, such as trip insurance, digital photos, reservations for a future sailing, etc.

Some products are offered and/or available for purchase or reservation at any time by the customer using, for example, a user computing device 106, while some products are offered and/or available for purchase or reservation at selected times and dates. Some products are available in unlimited, or virtually unlimited quantities, while some products are available in limited quantities. Any of the products offered and/or available may require a check-in or other identification of the customer at the time of attending the experience, receiving the item, etc.

The shore-based computing system 104 and/or the ship-based computing system 102 can also store data relating to each customer that is embarked on or is scheduled to embark on a particular sailing offered by the cruise operator. Customer data can include, but is not limited to, demographic information of the customer; historical information on reservations, purchases, and bookings by the customer on a previous sailing; information on products purchased, booked, or reserve by the customer for an upcoming sailing; and information on other passengers that are associated with the customer on a prior or upcoming sailing. It will be understood that such examples are not intended to be limiting, and any suitable information that can enhance recommendation services and systems described herein can be implemented.

Figure 2:
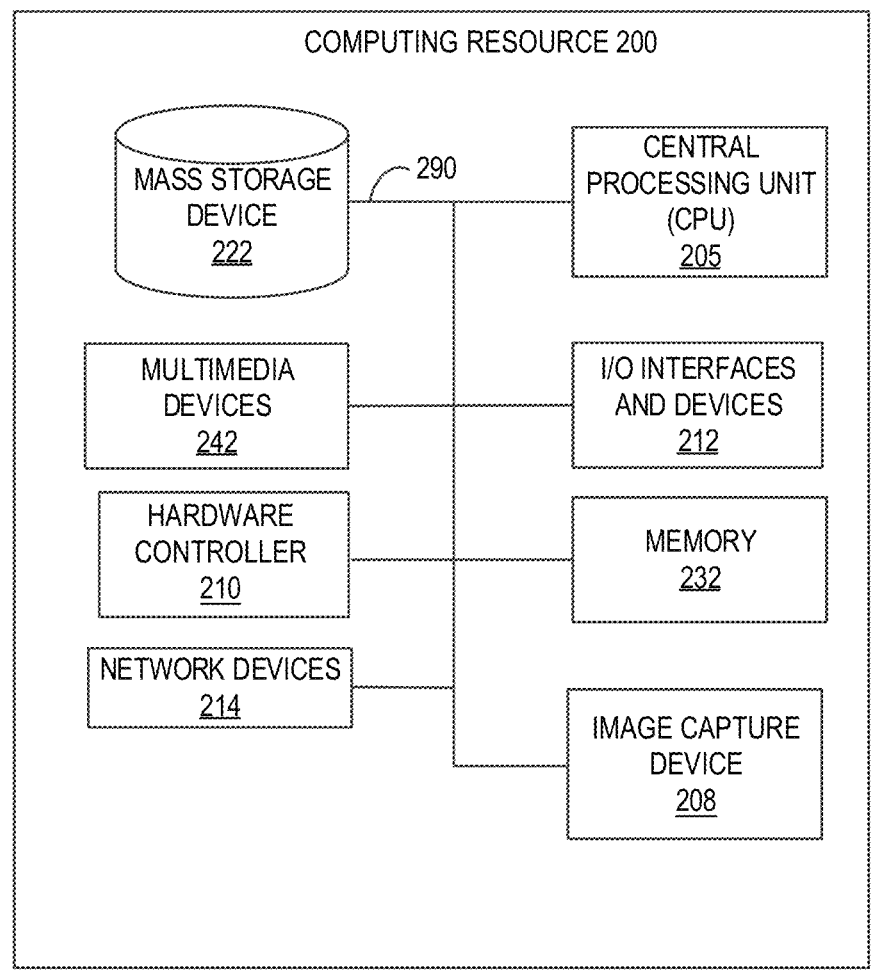
FIG. 2 shows a block diagram of exemplary components of a computing resource participating in the networked computing system of FIG. 1, according to an exemplary embodiment.

FIG. 2 illustrates a block diagram of exemplary components of a computing resource 200 participating in the networked computing system 100 of FIG. 1, according to an exemplary embodiment. The computing resource 200 may be used by, with, or as a component of, for example, one or more of the user computing devices 106 or the ship-based computing system 102. For example, the computing resource 200 may be in communication with and/or integrated within a device such as an embarkation device, a stateroom touchpoint, or a mobile touchpoint or crew device, and/or a standalone monitoring device located on or within the ship. The computing devices and systems include, for example, a computing device or system that is IBM, Macintosh, or Linux/Unix compatible or a terminal or workstation. In one embodiment, the computing system 200 includes one or more central processing units ("CPUs") 205, which may each include a conventional or proprietary microprocessor. In some embodiments, the CPU 205 may perform various computations, associations, etc., of data stored in a data store. Accordingly, the CPU 205 may enable the computing resource 200 to process information in a data store and generate information for transmission to and between other devices.

The computing resource 200 further includes one or more memory 232, such as random access memory ("RAM") for temporary storage of information, one or more read only memory ("ROM") for permanent storage of information, and one or more mass storage device 222, such as a hard drive, diskette, solid state drive, or optical media storage device. Typically, the components of the computing resource 200 are connected to the computer using a standard based bus system 290. In different embodiments, the standard based bus system 290 could be implemented in Peripheral Component Interconnect ("PCI"), Microchannel, Small Computer System Interface ("SCSI"), Industrial Standard Architecture ("ISA"), Extended ISA ("EISA"), and networked architectures, for example. In addition, the functionality provided in the components and modules of computing resource 200 may be combined into fewer components and modules or further separated into additional components and modules than as shown in FIG. 2.

The computing resource 200 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the computing resource 200 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing resource 200 may include one or more commonly available input/output (I/O) devices and interfaces 212, such as a keyboard, mouse, touchpad, and printer. In one embodiment, the I/O devices and interfaces 212 include one or more display devices, such as a monitor, that allows the visual presentation of data to a user. More particularly, a display device provides for the presentation of the user interface or GUI, application software data, and multimedia presentations, for example. The computing resource 200 may also include one or more multimedia devices 242, such as speakers, video cards, graphics accelerators, and microphones, for example.

In the embodiment of FIG. 2, the I/O devices and interfaces 212 provide a communication interface to various external devices. The computing resource 200 is electronically coupled to one or more networks, for example one or more of a LAN, WAN, and/or the Internet, via a wired, wireless, or combination of wired and wireless, communication links provided by one or more networking devices 214. For example, the computing resource 200 in this implementation may be electronically coupled to the network 110 and/or to an internal network of the ship-based computing system 102 of FIG. 1 via a wired or wireless connection using the networking devices 214. Other implementations are possible. Using the networking devices 214, the computing system 200 may communicate over networks with various computing devices and/or other electronic devices via wired or wireless communication links. In some embodiments, the networking devices 214 allow one computing system (for example, the ship-based computing system 102) to communicate with another computing system (for example, the shore-based computing system 104). Additionally, or alternatively, the networking devices 214 may allow the computing systems 102 and/or 104 to communicate with the user computing devices 106.

In some embodiments, the I/O devices and interfaces 212 may generate or provide the user interface (UI). The UI may allow for customers of the user computing devices 106 to browse, select, schedule, reserve, and purchase products. In some embodiments, the UI allows the customers to update customer information, for example profile information, profile preferences, interests, and so forth. In some embodiments, the UI allows for operators of the ship-based computing system 102 (e.g., crew members or other agents of the ship operator) to perform functions such as reviewing stored customer information, providing items or services based on facial recognition results, or identifying customers on the ship.

Embodiments of the computing resource 200 include various modules that will be described with reference to non-limiting examples. It will be understood that implementations of the facial recognition services and systems described herein are not limited to computing systems that only include these exemplary modules. In general, a "module" refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the user computing devices 106, the ship-based computing system 102, and the shore-based computing system 104, for execution by the computing resource 200. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware, or a combination thereof. Generally, the modules described herein refer to logical modules that may be combined with other modules or divided into sub-modules despite their physical organization or storage.

In various example embodiments of FIG. 2, for example, in which the computing resource 200 is a user computing device or operates a ship-based touchpoint or monitoring device, an image capture device 208 is in communication with the central processing unit 205. The image capture device 208 is configured to capture images of one or more people in the vicinity of the computing resource 200. In some embodiments, the captured images may be sent to another device such as a central server or data center of the ship-based computing system 102 for analysis to determine a facial recognition result, or the captured images may be analyzed locally at the computing resource 200. The image capture device 208 may be configured to capture images continually on a periodic basis, and/or may be configured to capture images on an event-based basis, such as at a predetermined time, based on a user request to capture one or more images, based on motion detection, and/or based on an input received from another device within the ship-based computing system 102.

In further example embodiments of FIG. 2 in which the computing resource 200 operates a ship-based touchpoint, a hardware controller 210 may be in communication with the CPU 205 to cause actuation of a physical device such as an access point or a barrier, based on a facial recognition result. For example, if the computing resource 200 is a touchpoint integrated with a stateroom door, the hardware controller 210 may cause a lock of the stateroom door to unlock based on a facial recognition result indicating that a person at the door is authorized to enter. In other examples, the hardware controller 210 may actuate a movable barrier such as a turnstile in an access-controlled environment, may cause an automated dispensing or vending device to release an item to a customer, etc.

Figure 3:
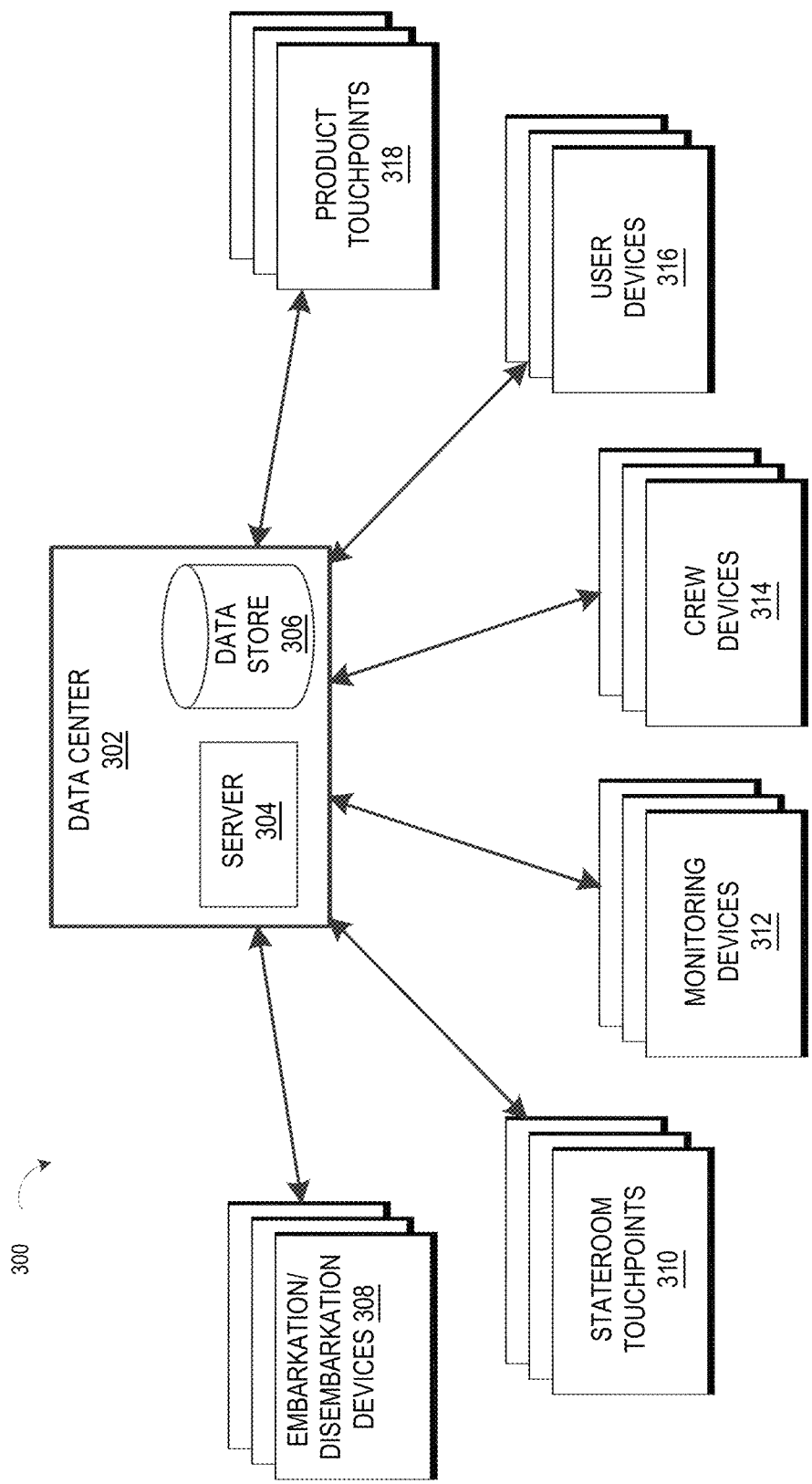
FIG. 3 shows a block diagram of a ship-based computing system including a networked system of computing resources integrated within a vessel.

FIG. 3 shows a block diagram of a ship-based computing system 300 such as ship-based computing system 102 of FIG. 1, including a networked system of computing resources integrated within a ship, according to an exemplary embodiment. The ship-based computing system 300 includes a data center 302, including a server 304 and a data store 306, as well as various touchpoints and connected devices located throughout the ship. Example touchpoints and other connected devices can include, but are not necessarily limited to, embarkation/disembarkation devices 308, stateroom touchpoints 310, monitoring devices 312, crew devices 314, user devices 316, and product touchpoints 318. Further, although not illustrated in FIG. 3, it will be understood that the components of the ship-based computing system 300 described with reference to FIG. 3 are scalable and can be replicated on each ship in the cruise operator's fleet of ships. Thus, although the networked system 300 is explained below with reference to a single ship, the networked system 300 can include multiple ship-based computing systems 300 deployed across a fleet of ships, each communicating with a shore-based computing system 104 as shown in FIG. 1.

The data center 302 can include one or more computing devices, including at least a server 304 and a data store 306. The server 304 is configured to communicate via wired and/or wireless communications with any of the touchpoints and connected devices in the networked system 300. The server 304 and/or one or more other computing devices of the data center 302 are configured to perform facial recognition operations as described herein. The data store 306 stores customer information for individual customers such as facial recognition data, travel party information, itinerary information, tracking information, interaction information, and/or linked device information.

Facial recognition data stored in the data store 306 may include information specific to each customer, such as image data corresponding to known images of the customer, landmarks, features, or other geometric information associated with the customer's facial appearance, and/or any other information usable by facial recognition algorithms to recognize the customer from subsequently captured images of the customer.

Travel party information may include information identifying, for an individual customer, other customers known to be associated with the customer. Travel party information may include identifiers corresponding to the other customers of a group reservation, and/or may include identifiers corresponding to travel party members indicated by the customer or a member of the customer's travel party.

Itinerary information may include details of all products on the customers' itineraries for customers on the sailing of the ship. Details of products in customers' itineraries can include any applicable parameter, depending on the nature of the particular product that the customer reserved, booked, or purchased. For example, the itinerary information can include one or more of a name of a product, a location of a product, a start time of a product, an end time of a product, and a duration of a product.

Tracking information may include historical data regarding previous known locations of a customer. In one implementation, tracking information includes a list of time-stamped locations where the customer's location was verified during the cruise. Tracking information may be received from, or determined based on, data received at the data center 302 from touchpoints or connected devices throughout the ship with which the customer has interacted. Interaction information may include further information regarding such interactions with touchpoints or connected devices.

Linked device information may include information identifying user devices 316 and linking individual user devices 316 to individual customers or groups of customers. For example, a mobile device such as a tablet computer or cell phone belonging to a customer may be identified by an identifier in the linked device information and associated with a customer identifier. In some embodiments, linked device information for each device is obtained when a customer aboard the ship connects a user device 316 to an onboard wireless network. The customer may be prompted to enter identifying information in order to sign onto the wireless network, thus providing to the data center 302 the necessary information to associate the linked user device 316 and the customer.

Embarkation/disembarkation devices 308 may be computing devices consistent with the computing resource 200 of FIG. 2. Embarkation/disembarkation devices 308 may be located at locations where customers embark or disembark from the ship and configured to interact with customers as they embark or disembark. In some embodiments, embarkation/disembarkation devices 308 may be located in an area near an embarkation/disembarkation point of the ship, such as in a cruise terminal, on a pier, and/or in any facility the processes or interacts with customers as they embark or disembark from the ship. In some embodiments, separate embarkation devices and disembarkation devices may be provided, or may be combined in a single embarkation/disembarkation device.

The embarkation/disembarkation devices 308 may be used for initial data capture for a customer as the customer embarks for the first time. Thus, the image capture device 208 may be configured to obtain one or more relatively high-quality images of the customer's face to provide sufficient data for subsequent facial recognition events. Accordingly, the image capture device 208 of an embarkation/disembarkation device 308 may include a still or video camera located at approximately face level to obtain a centered (e.g., passport-style) photograph of each customer. In some embodiments, the height of the image capture device 208 may be adjustable to obtain images of sufficient quality of customers of various heights. Multiple cameras may be included, for example, to simultaneously capture front and side views of a customer's face.

The I/O interfaces and devices 212 of each embarkation/disembarkation device 308 may include an input such as a graphical user interface or the like, to permit manual operation by a device operator. For example, an operator may instruct each arriving customer to stand and look into the image capture device 208. The operator may then use the user interface to cause the image capture device 208 to take one or more photos of the customer before the customer proceeds. The embarkation/disembarkation device 308 can transfer the one or more photos to the data center 302, where they may be stored in association with a customer profile or other data structure in the data store 306. In some embodiments, the customer profile may further be updated to indicate an "onboard" status of the customer.

Embarkation/disembarkation devices 308 may further be configured for disembarkation operations, for example, to identify individual customers as they disembark. In some embodiments, embarkation/disembarkation devices 308 may also be used to identify customers temporarily leaving or returning to a ship at an intermediate port of call. For example, when a ship arrives at a port such as an intermediate port of call on a cruise, embarkation/disembarkation devices 308 may be located at each exit point such that each customer leaving the ship temporarily at the port passes through an embarkation/disembarkation device308. In other embodiments, other devices such as crew devices 314 may be used to monitor customers temporarily leaving and returning to the ship at intermediate ports of call. The image capture device 208 may include a still or video camera configured to capture images on a continuing basis as customers disembark. Facial recognition algorithms at the server 304 and/or at each embarkation/disembarkation device 308 can analyze the captured images to identify each customer leaving the ship. A temporary exit event may be recorded and stored in association with the customer and a timestamp in the data store 306. When each customer returns to the ship, the customer can be photographed and identified at the same or a different embarkation/disembarkation device 308 or crew device 314, and the customer's return may be recorded in the customer profile at the data store 306. Accordingly, the present technology may allow the computing system 300 to reliably determine whether all customers have returned to the ship prior to leaving a port, and to further identify which individual customers may still be ashore if less than all passengers have returned. When used at a time of disembarkation, the present technology may further allow the computing system 300 to reliably determine whether all customers have disembarked prior to allowing passengers for a subsequent sailing to embark.

Stateroom touchpoints 310 may be computing devices consistent with the computing resource 200 of FIG. 2. The stateroom touchpoints 310 may be located at stateroom entrances and may be configured to control access to individual staterooms aboard the ship based on facial recognition. A hardware controller 210 of a stateroom touchpoint 310 may be configured to actuate a door lock (such as but not limited to an electronic door lock) to prevent or provide access to the associated stateroom. The image capture device 208 of the stateroom touchpoint 310 can be an outward-facing camera configured to capture an image of the face of a person requesting access to the stateroom. Presence of a person within a particular distance of the stateroom camera and/or within a particular volume or space surrounding the stateroom camera may be deemed a request to access the stateroom. In another example, a person actuating or pressing a button or other input device at the stateroom camera location may be deemed a request to access the stateroom. Other implementations of access requests are possible. Upon capturing an image of a person attempting to gain access to the stateroom, the stateroom touchpoint 310 may transmit the image to the data center 302 via networking device 214. At the data center 302, the image may be analyzed using a facial recognition algorithm to identify the person as a particular customer. If a customer identity is verified, the data center 302 may further determine whether the identified customer has access privileges for the stateroom associated with the touchpoint 310. For example, the stateroom touchpoint 310 may query the data store 306 to determine if an identifier of the particular stateroom is stored in association with a customer profile of the particular customer, which may indicate that the customer has access privileges for the stateroom. If the identified customer does have access privileges for the stateroom, the access request is granted. For example, the server 304 may send a control message to the touchpoint 310 that causes the hardware controller 210 to unlock the stateroom door. Accordingly, the present technology may allow customers to access staterooms using a facial identification, rather than requiring customers to carry a physical identity credential each time they leave their staterooms.

In some embodiments, a stateroom touchpoint 310 and/or a stateroom access control system including a stateroom touchpoint may use local processing or a combination of remote and local processing to control access to a stateroom. For example, the stateroom door may be lockable and unlockable by an electronic door lock. The electronic door lock may be configured to unlock based on receiving a digital key. The electronic door lock may further be configured to communicate with a database storing the digital keys for the electronic door locks of the ship. When a stateroom door is to be unlocked, the stateroom touchpoint 310 and/or a computing device of the data center 302 may cause the corresponding digital key to be transmitted from the database to the electronic lock such that the electronic lock unlocks the stateroom door upon receipt of the digital key. Suitable electronic door locks are made, for example, by ASSAY ABLOY®.

The stateroom touchpoint 310 and/or stateroom access control system may further include a local data store in which customer profile information can be stored. For example, the local data store may store the customer profiles, or portions of the customer profiles (e.g., only the facial recognition data required to generate facial recognition results) of those customers associated with and permitted to access the stateroom. The customer profile information in the local data store may be received from the data center 302 at the beginning of a sailing, and/or may be updated later on an event-based or periodic basis if changes are made to the set of customers granted access to the stateroom. For example, one or more customers may be added or removed from the set of customers to be allowed to access the stateroom, and the data center 302 may cause customer profile information to be added to or removed from the local data store to reflect the changes.

In operation, the stateroom touchpoint 310 may include a wide angle camera (e.g., with a 180 degree field of view) positioned to image the surrounding public area, such as a hallway or passageway outside the stateroom. It will be understood, however, that other suitable cameras can be implemented. When a person is located within the imaged area, the camera creates an image of the face of the person and sends the image to the processor of the stateroom touchpoint 310. Responsive to receiving the image, the processor of the stateroom touchpoint 310 can generate a facial recognition result using the same or similar facial recognition algorithms to those used at the data center 302 for remote generation of facial recognition results. If the facial recognition result indicates that the imaged person is a customer allowed to access the stateroom, the local processor may then communicate with the data center 302 and/or the digital key database to cause the appropriate digital key to be sent from the digital key database to the electronic lock to unlock the stateroom door.

Advantageously, because the local processor of the stateroom touchpoint 310 is generating a facial recognition result based on only the small subset of stored profile information for the customers associated with the stateroom, rather than the profile information for all customers on the ship, this local generation of facial recognition results may be performed quickly and with relatively little processing power required. The stateroom touchpoint 310 and/or access control system may further include a local power supply configured to supply electrical power in the absence of ship power (e.g., if a ship-based power supply is interrupted locally or across the entire ship). Thus, the combination of a local power supply, local data store, and local processor may permit customers to have uninterrupted access to their staterooms in the event of the loss of ship power, loss of network connectivity, or other system failures that might otherwise inhibit operation of the ship-based facial recognition systems and methods.

Monitoring devices 312 may be computing devices consistent with the computing resource 200 of FIG. 2. In some embodiments, monitoring devices 312 may be passive detection devices configured to identify customers traveling throughout the ship, but not configured to interact physically with the customers. In one example, monitoring devices 312 include connected observation or CCTV cameras located in public areas of the ship, such as corridors, decks, activity areas, dining areas, bars, or the like. Monitoring devices 312 may have image capture devices 208 including cameras configured to capture video or periodic still images of an area on or within the ship. Obtained video or still images may be analyzed at the CPU 205 of the monitoring device and/or at the data center 302 to identify portions of the images corresponding to faces, and to identify customers based on the identified faces in the images. When a customer is positively identified, a location (e.g., corresponding to the location of the monitoring device 312) and a timestamp (e.g., a timestamp received from the monitoring device 312 with the image) may be stored in the data store 306 as a tracking information item in the customer's profile.

Crew devices 314 may be computing devices consistent with the computing resource 200 of FIG. 2. Crew devices 314 are stationary or mobile devices configured to be operated by ship crew members or other employees or operators working on the ship. For example, a bartender in a bar aboard the ship may use a crew device 314 as or in conjunction with a point of sale terminal. The crew device 314 may be able to identify a customer ordering a drink, and indicate to the bartender whether the customer is old enough to order an alcoholic beverage, whether the customer has purchased a beverage package, whether to incur an a la carte charge for the beverage, etc. (e.g., the indication may comprise displaying a message to the bartender at an output device such as multimedia device 242). Accordingly, the image capture device 208 of the crew device 314 may be an outward-facing camera configured to capture a still image of a customer based on an input from the user of the crew device 314. The captured image is sent via the networking device 214 to the data center 302, where the customer can be identified using implementations of facial recognition services and systems described herein. In the non-limiting example of a crew device 314 in a bar, the data center 302 may determine whether the customer has purchased an entitlement such as a beverage package based on information in the customer profile in the data store 306. Based on the determination, the crew device 314 provides an instruction to the bartender using a multimedia device 242 such as a display. In another non-limiting example, a crew device 314 is a camera used by an onboard photographer to photograph customers or groups of customers (e.g., to provide souvenir photos). The data center 302 may determine the identity of one or more customers that were photographed, and may further cause the photograph to be stored at the data store 306 in association with the customer profiles corresponding to the identified customers. Some crew devices 314 may include or be in communication with other devices used by crew members, such as mobile devices, augmented reality devices, or other portable devices carried by crew members. Further applications of crew devices are described in greater detail below.

User devices 316 may be computing devices consistent with the computing resource 200 of FIG. 2. In some embodiments, user devices 316 may be customer-owned devices brought on board by the customers, such as personal cell phones, tablet computers, laptop computers, or the like. User devices 316 may include networking devices 214 through which the user devices 316 may connect to a ship-based network, such as a wireless network. Upon connecting a user device 316 to the wireless network for the first time, a user (e.g., a customer) may be prompted to enter customer identifying information such that a device identifier of the user device 316 can be stored in the data store 306 in association with one or more customer profiles. Advantageously, customers may have photos taken and saved for them without having to present an identity credential, and may increase the accuracy and reliability, and decrease wait times, associated with photography events. In further examples, the photographed customers may subsequently be offered photo products or services based on the photographs linked to the customers' profiles using facial recognition services and systems of the present technology. The user devices 316 may further include applications executing thereon that provide for customer interaction with the data center 302. For example, an application provided by or associated with the operator of the ship may include a graphical user interface allowing the user to perform interactions such as ordering food or beverages, purchasing products, modifying itineraries, and the like.

Product touchpoints 318 may be computing devices consistent with the computing resource 200 of FIG. 2. Similar to crew devices 314, product touchpoints 318 may be stationary or mobile devices operable by crew members. Product touchpoints 318 may be located at sites where items can be purchased and/or at the locations of experiential products such as dining options, entertainment events, activities, and the like. In some embodiments, a product touchpoint 318 may include image capture devices 208 including a still and/or video camera. Accordingly, customers entering experiential products or purchasing items may be positively identified to record attendance or purchases, without requiring the customers to carry physical identity credentials.

Facial Recognition Confidence Enhancement Based on Data Association

Facial recognition services and systems described herein can advantageously improve the confidence level of individual facial recognition events by augmenting the facial recognition algorithms with data regarding further associations with a customer. For example, as described above, facial recognition may be used as a criterion for granting access to staterooms of a ship. However, because staterooms are access-restricted areas intended to be private to the customer or customers occupying the stateroom, it may be desirable for stateroom access to require a relatively higher confidence level of a facial recognition event as compared, for example, to a less critical event such as ordering a food item, adding a tracking data point, admission to a low-risk event, or the like. Thus, confidence level enhancement based on data association may advantageously allow the facial recognition services and systems described herein to more reliably achieve facial recognition results with sufficient confidence levels to replace other forms of identity credentialing. In some cases, such as when a facial recognition result initially has a low confidence level due to poor photo quality or a customer's changed appearance, the confidence level enhancements described herein allow the ship-based computing system 300 to convert an event that would be an error in conventional facial recognition systems into a positive identification. In some cases, the system 300 converts a low-confidence identification (or a suspected identification) to a positive identification when the system's confidence level in the identification exceeds a minimum threshold value, where the threshold value differs based on the event, product, or access for which the identification is being used. For example, access to a stateroom may require a relatively high confidence level such as 0.95 or greater, while other requests may require lower confidence levels (e.g., ordering an alcoholic drink may require a lower but heightened confidence level such as 0.80 or greater, ordering other items with financial costs such as food or nonalcoholic beverages may require a confidence level such as 0.60 or greater, making reservations for a cooking class or other low-cost or free products may require a low confidence level such as 0.50 or greater, etc.).

In some embodiments, the threshold confidence level for a particular interaction may be set and/or optimized based on a combination of parameters, such as speed and security. For example, a facial recognition event may require more time (e.g., several seconds, up to 10 or 15 seconds, depending on the initial confidence level of a facial recognition result) to generate a facial recognition result meeting a high threshold result strength, while a facial recognition result with a lower threshold result strength may be obtained more quickly (e.g., within 1-5 seconds). Accordingly, the threshold result strength for access to a particular location or product may be set individually based on a desired balance between high security and immediacy of suitable facial recognition results. Several example implementations of data-driven confidence level enhancement will now be described with regard to operations that may be performed by elements of a ship-based computing system 102 or 300, such as a data center 302 and/or server 304, in conjunction with data stored in a data store 306. Any or all of the following confidence level enhancement implementations may be applied individually or in combination for one or more facial recognition results.

In a first example, the confidence level of a facial recognition result may be improved based on association with members of a known travel party. A customer's profile may be linked to the profiles of one or more other customers in the same travel party as the customer. For example, the customer or another customer in the travel party may list the customer and/or the other members of the travel party as travel party members at a time of booking, at a time after booking and before the beginning of the cruise, at the time of embarkation, or subsequently during the cruise. In some embodiments, travel party associations may be stored automatically in the data store 306 based on a determination that two or more customers are frequently detected together. Subsequently, when a facial recognition event occurs that identifies the customer, the server 304 or other data center 302 component may search the data store 306 for other facial recognition events identifying other members of the travel party at nearby locations having recent timestamps. If another member of the customer's travel party is identified as being in the same location or a nearby location at approximately the same time, it may be determined that the initial facial recognition result is more likely to be correct due to the presence of a known travel party member nearby, and the confidence level or an associated result strength of the facial recognition result may accordingly be increased.

In another example, the confidence level of a facial recognition result may be improved based on the last known interactions of a customer. A customer's profile may include information identifying other customers with whom the customer has recently been observed interacting or traveling. The other customers of last known interactions may not necessarily be members of the customer's travel party. In some embodiments, last known interactions may be detected and stored automatically in the data store 306 based on a determination that two or more customers are frequently detected together. Subsequently, when a facial recognition event occurs that identifies the customer, the server 304 or other data center 302 component may search the data store 306 for other facial recognition events identifying other members of previous interactions at nearby locations having recent timestamps. If another customer with whom the customer has recently interacted is identified as being in the same location or a nearby location at approximately the same time, it may be determined that the initial facial recognition result is more likely to be correct due to the presence of a previously associated customer nearby, and the confidence level or an associated result strength of the facial recognition result may accordingly be increased.

In another example, the confidence level of a facial recognition result may be improved based on corroboration with a known itinerary of the identified customer. For example, a customer's profile in the data store 306 may indicate that the customer has reserved a first activity at 4:00 p.m. If a facial recognition event at the activity location occurs at approximately 4:00 p.m. (e.g., between 3:45 and 4:15 p.m.), and produces a facial recognition result identifying the customer, the confidence level or an associated result strength of the facial recognition result may accordingly be increased due to the consistency between the customer's itinerary and the location and timestamp of the facial recognition result. However, if a facial recognition event occurs at approximately 4:00 at a different activity, or at another location on the ship relatively distant from the planned activity, and identifies the customer, the confidence level or associated result strength of this facial recognition result may be unchanged or decreased due to the inconsistency with the planned itinerary.

In yet another example, the confidence level of a facial recognition result may be improved based on a customer's last known location and/or trajectory (e.g., the customer's last known whereabouts, direction, and/or time). For example, a second facial recognition event located relatively close to a recent previous facial recognition event and identifying the same customer may have its confidence level or associated result strength increased due to the proximity to the customer's previous location. In another example, a customer trajectory may be determined based on a plurality of facial recognition results. For example, a customer is detected in a first facial recognition event near the bow of the ship on the starboard side on a first level. Several minutes later, the customer is detected in a second facial recognition event on the same level on the starboard side, at a position further aft relative to the first facial recognition event. Based on the detected trajectory of the customer walking aft along the starboard side of the ship, the confidence level or associated result strength of a result of a third facial recognition event may be increased if the third facial recognition event detects the same customer on the starboard side of the ship at a third point further aft relative to the second facial recognition event and optionally within a predetermined time interval.

In another example, the confidence level of a facial recognition result may be improved based on a predicted location of a customer. Predicted locations may be determined based on previously detected activities of the customer. In one example, a customer may be detected leaving a restaurant (e.g., by a monitoring device 312, a product touchpoint 318 located at the restaurant, etc.) at a first time (e.g., after dinner). Based on the detection of the customer leaving the restaurant, the data center 302 may determine one or more predicted locations where the customer is likely to go. For example, even if the customer's itinerary does not include any scheduled itinerary items for the remainder of the evening after dinner, the data center 302 may identify several locations, such as one or more bars or dessert vendors, nightclubs, the customer's stateroom, or other locations where customers frequently travel following an evening meal. Predicted locations may also be determined based on an individual customer's previous known locations. For example, if a customer has been identified at a pool or lounge area immediately after lunchtime each previous day of a cruise, the pool or lounge area may be identified as a predicted location in the afternoon on subsequent days of the cruise. Predicted locations may additionally be determined based at least in part on predicted locations or past behavior of other associated customers (e.g., an affinity group), and/or based on established crowd patterns of a larger number of customers not necessarily associated directly with the customer. When the location of a facial recognition event is identified as being a predicted location of the potentially identified customer, the confidence level or associated result strength of the result of the facial recognition event can be increased In a further example, the confidence level of a facial recognition result may be improved based on additional data such as clothing or accessories worn by a customer, and/or the presence of a user device 316. For example, if a first facial recognition event detects a customer and identifies that the customer is wearing a red shirt or a distinctive hat, the confidence level or associated result strength of a subsequent facial recognition result may be increased if the subsequent result identifies the same customer and is associated with a detection of a red shirt or a similarly shaped hat. In another example, customers frequently carry user devices 316, such as cell phones, tablet computers, e-reader devices, or the like, as they travel about the ship. As described above, user devices 316 may be connected to a wireless network of the ship and may be linked to individual customers. If a customer is identified in a facial recognition event, and it is determined at the data center 302 that a user device 316 associated with the customer is connected to a wireless network node or endpoint in close proximity to the location where the facial recognition event occurred, the confidence level or associated result strength of the result of the facial recognition event can be increased.

It will be understood that any of the confidence level enhancement techniques described above may be implemented individually or in combination. Additionally, the data associations utilized to increase confidence levels and/or result strengths as described above are merely examples and are not intended to be an exclusive list. Other corroborating data may be used to increase confidence levels and/or result strengths without departing from the spirit or scope of the present technology.

Example Facial Recognition Implementations of the Present Technology

The advantageous facial recognition implementations described herein may be used throughout the duration of a cruise or other event to enhance customer experiences by providing seamless transitions between activities, dining events, and other products, without requiring customers to carry and keep track of physical identity credentials. Several example implementations will now be described with reference to the ship-based computing system 300 of FIG. 3.

In some embodiments, customers can gain access to their staterooms using a facial recognition system of the present technology rather than a key card or other credential. In the data store 306, a customer profile may be linked with a stateroom identifier associated with the customer's reserved stateroom. While aboard the ship, the customer may unlock the door to the stateroom by showing his or her face at the stateroom touchpoint 310 integrated with the customer's stateroom, as described above with reference to FIG. 3. When multiple customers, such as family members, are staying together in the same stateroom, each of the corresponding customer profiles in the data store 306 is linked to the stateroom identifier such that any of the family members can individually gain access to the stateroom at any time using facial recognition. In addition, a stateroom occupant may grant permission for one or more other customer profiles to be linked with the same stateroom identifier such that a selected group of customers (e.g., other family or friends staying in a different stateroom) can gain access to the occupant's stateroom. In one example implementation, stateroom occupants may be permitted to add other customers to an allowed access list using a self-serve feature of a cruise operator-associated application on the customer's mobile device. In some embodiments, the application may be configured to limit access to the self-serve feature to certain members of a travel party (e.g., to allow parental control or override functionality, and to ensure adherence to security measures or other onboard regulations). In some embodiments, the self-serve feature may be implemented in a "plan your cruise" feature on the cruise operator's website.

In some embodiments, the facial recognition services and systems of the present technology can enable customers to check in at a time of embarkation at the beginning of a cruise and to check out at the end of the cruise, using facial recognition rather than other identity documents or credentials. Customers can similarly "ping" off and onto the ship when leaving the ship temporarily (e.g., when leaving the ship and returning to the ship at an intermediate port). Facial recognition events for check in, check out, and for temporarily leaving the ship can be performed by embarkation/disembarkation devices 308 and/or by crew devices 314, as described above with reference to FIG. 3.

In some embodiments, the facial recognition services and systems of the present technology can be used to obtain affirmations of risk acknowledgement from customers participating in certain activities. Certain activities, such as rock climbing, wakeboarding, bungee jumping, or the like, may require participating customers to sign or affirm a statement indicating that the participating customer acknowledges risks inherent in the activity. In order to ensure that such affirmations are effective, the affirmations may be provided at touchpoints such as product touchpoints 318 or crew devices 314 configured to capture video. In an example implementation, a statement regarding the risks to be acknowledged is presented to the participating customer at a multimedia device 242 of a crew device 314 or product touchpoint 318. The user is then prompted to speak a response into the image capture device 208, indicating that the user has read the statement and acknowledges the risks. A video of the user's response may be stored and transmitted to the data center 302 to be stored in the data store 306. At the data center 302, one or more frames of the video may be analyzed using a facial recognition algorithm to generate a facial recognition result identifying the customer, and the risk acknowledgement statement may be verified and/or may be stored in the data store 306 in association with the customer's profile. In some embodiments, a threshold confidence level of the facial recognition result may be required in order to verify the risk acknowledgement statement. The system can be configured to automatically perform further analysis based on previously stored data of the customer to confirm the initial facial recognition result is accurate. In another example, the system determines if the facial recognition result has a confidence value greater than or equal to the threshold value and can require additional information or an additional video recording to be obtained until the facial recognition result surpasses the minimum threshold value.

In some embodiments, a customer may order items such as food or beverages, and/or may have items delivered to the customer, based on recognizing customers' entitlements using the facial recognition services and systems of the present technology. In one example, a customer may order an item at a bar, restaurant, or other service location where a crew member operates a crew device 314. The crew member may record the customer's order, or the order may be transcribed by a speech-to-text application executing on the crew device 314. The crew member may then photograph the customer's face using the image capture device 208 of the crew device 314 to verify the customer's identity. The photograph may be sent to the data center 302, where a facial recognition result identifying the customer is generated. In response to the facial recognition result and the order recorded at the crew device 314, the data center 302 may cause the order to be processed. For example, if the corresponding customer profile in the data center 306 indicates that the customer has purchased a food or beverage package that includes the requested item, the data center 302 notify the crew member via the crew device 314 to provide the requested item, approve an order, or the like. If the corresponding customer profile in the data center 306 indicates that the customer does not have a food or beverage package that includes the requested item, the data center 302 may cause the order to be declined, or may cause the order to be granted and apply an a la carte charge for the requested item, such as by debiting an expense account of the customer or by recording a charge on the customer's bill.

In some embodiments, the facial recognition services and systems of the present technology may be used to provide crew members with location information of individual customers. In one example, a customer may be able to order a food or beverage item to be delivered to the customer at the customer's present location. After the order is placed and before the requested item is delivered, the customer may be tracked, such as by monitoring devices 312, to determine the customer's location. The customer's location can accordingly be sent to a crew device 314 operated by a crew member delivering the item to the customer. The crew device 314 may thus provide detailed instructions to the crew member to permit the customer to be located quickly for prompt delivery of the item, such as to facilitate the "last mile" of the crew member's trip to the customer's location (where the "last mile" refers to some distance, for example but not limited to within the last five to ten meters of the crew member's trip). In some embodiments, crew members may further use augmented reality devices or other display devices to provide visual cues, based on the customer location information, to direct the crew member to the customer. Such location information may similarly be used for other customer location purposes, such as for assisting security crew members in locating a lost child or any other customer who needs to be located. In some embodiments, if a customer is in a group of individuals in a lounge area when the customer places an order, the system can identify the customer on the basis of various factors described herein such as but not limited to identification of individuals in the group as travel party members associated with the customer, identifying features of the customer, last known location of the customer, presence of the customer's user device proximate to the group, etc. The confidence level of the facial recognition result can be increased in real time as the system analyzes additional data that becomes available, for example, as the crew member travels toward the customer with the requested item.

In some embodiments, professional photographers may be present during a cruise to photograph customers, for example, to provide customers with photographs of their cruise experiences to keep in electronic or physical forms as souvenirs, to show to friends, etc.

Photographers typically utilize digital cameras. After an onboard photographer takes one or more images, the images may be transferred via a wired or wireless connection to the data center 302, where they can be stored in the data store 306. The facial recognition processes described herein may equally be applied to the customer photographs in order to automatically associate the photos with the corresponding customers. In some embodiments, the set of photos determined to be associated with an individual customer may be made available and/or shareable to the customer and any associated travel party members during and/or after the cruise, such as through an application on a user device 316. The customer may additionally be able to approve or decline individual photos associated with the customer's profile, such as in a photo stream application or the like. By applying the disclosed facial recognition technology to customer photos, the cruise operator can take and provide souvenir photos to customers without requiring the photographed customers to provide identifying information or credentials to the photographer when the photos are taken.

Additional Embodiments

It will be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

Although the facial recognition services and systems described above are generally described in the context of providing access, goods, and/or services to customers of a cruise operator, the teachings of the present technology may be applied in a variety of different contexts. For example, access control may be desirable in the contexts of entertainment events, hotels or other hospitality services and systems, other transportation systems such as airlines, train operators, and the like, banking and other financial services and systems, healthcare services and systems, and health information technology (HIT) services and systems. The facial recognition services and systems of the present disclosure, including location access control, facial recognition result confidence level enhancement, and other features disclosed herein may be applied to allow and/or improve the use of facial recognition in any of the contexts recited above.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

What is claimed is:

1. A system for access control on a cruise ship, the system comprising:
    a data store on the cruise ship having stored thereon a plurality of customer profiles associated with individual customers embarked on the cruise ship, the data store in communication with a ship-based network;
    a plurality of networked computing devices located at least partially in public areas of the cruise ship, each of the networked computing devices comprising an image capture device and a networking device configured to communicate with the ship-based network;
    a processor in communication with the data store and the plurality of networked computing devices, the processor configured to:
        receive, from a first device of the plurality of networked computing devices, a first request for access to a product or location associated with at least a first customer;
        receive, from the first device, an image of a requestor associated with the request;
        generate, based on one or more facial recognition software algorithms and preexisting facial recognition data associated with the first customer stored in the data store, a facial recognition result indicating that the image of the requestor is an image of the first customer; and
        cause access to the product or location to be granted to the first customer, based at least in part on the facial recognition result; and
    a stateroom access control system disposed within or proximate to a door of a stateroom of the cruise ship, the stateroom access control system comprising:
        an electronic door lock configured to unlock the door based on receiving a digital key via an electronic lock network connection;
        a local data store having stored thereon at least a portion of one or more profiles of the plurality of customer profiles, the one or more profiles associated with customers permitted to access the stateroom;
        a wide angle camera configured to image a public area of the cruise ship adjacent to the door of the stateroom;
        a local power supply configured to provide electrical power to the stateroom access control system in the event of an interruption of ship power; and
        a local processor in communication with the local data store and the wide angle camera, the local processor configured to:
            receive, from the wide angle camera, an image of a face of a person disposed within the public area;
            locally generate, based on one or more facial recognition software algorithms and the at least a portion of the one or more profiles, a facial recognition result indicating that the person is one of the customers permitted to access the stateroom; and
            cause transmission of the digital key to the electronic door lock in response to the facial recognition result.

2. The system of claim 1, wherein the local processor is further configured to:
    receive, from the data store, at least a portion of one or more additional profiles of the plurality of customer profiles, the one or more additional profiles associated with additional customers subsequently permitted to access the stateroom;
    cause the at least a portion of the one or more additional profiles to be stored in the local data store; and
    locally generate at least one subsequent facial recognition result based at least in part on the at least a portion of the one or more additional profiles.

3. The system of claim 1, wherein the local processor is further configured to:
    receive a communication indicating that access privileges are revoked for a first customer of the customers permitted to access the stateroom; and
    cause the at least a portion of the profile associated with the first customer to be removed from the local data store.

4. The system of claim 1, wherein the digital key is stored within a key database remote from the stateroom access control system, and wherein causing transmission of the digital key comprises causing the digital key to be transmitted from the key database to the electronic door lock.

5. A system for identifying customers embarked on a cruise ship, the system comprising:
- a data store on the cruise ship having stored thereon a plurality of customer profiles associated with individual customers embarked on the cruise ship, the data store in communication with a ship-based network;
- a plurality of networked computing devices located at least partially in public areas of the cruise ship, each of the networked computing devices comprising an image capture device and a networking device configured to communicate with the ship-based network; and
- a processor in communication with the data store and the plurality of networked computing devices, the processor configured to:
  - receive, from a first device of the plurality of networked computing devices, a first request for access to a product or location associated with at least a first customer;
  - receive, from the first device, an image of a requestor associated with the request;
  - generate, based on one or more facial recognition software algorithms and preexisting facial recognition data associated with the first customer stored in the data store, a facial recognition result indicating that the image of the requestor is an image of the first customer, the facial recognition result including a result strength value indicative of a confidence level of the facial recognition result; and
  - cause access to the product or location to be granted to the first customer, based at least in part on the facial recognition result and based at least in part on the result strength value exceeding a predetermined threshold,
  - wherein the processor is configured to select the predetermined threshold from at least a first predetermined threshold and a second predetermined threshold higher than the first predetermined threshold, and
  - wherein the processor is configured to select the second predetermined threshold when the request is a request to enter a stateroom.

6. The system of claim 5, wherein the processor is further configured to adjust the result strength value based on one or more other information items stored in the data store in association with the first customer.

7. The system of claim 6, wherein the one or more other information items comprise one or more of other customers associated with the first customer, itinerary information, one or more previous facial recognition results, a predicted location, or a detection of a user device of the first customer near the requestor's location.

8. The system of claim 5, wherein the first device comprises a video capture device, and wherein the first device is configured to capture a video of the requestor and to send the video to the processor.

9. The system of claim 8, wherein the processor is configured to isolate a frame of the video for facial recognition, and wherein the image of the requestor comprises the isolated frame of the video.

10. The system of claim 5, wherein access to the product or location is granted based at least in part on a customer profile stored in the data store and associated with the first customer.

11. The system of claim 10, wherein the customer profile is selected from a plurality of stored customer profiles based on the facial recognition result.

12. The system of claim 10, wherein the processor is further configured to determine, based on the customer profile, that the first customer is entitled to access to the requested product or location.

13. The system of claim 10, wherein the request is a request for a product, and wherein the processor is further configured to:
- determine, based on the customer profile, that the first customer has not paid for the product;
- bill the first customer for a price of the product; and
- cause access to the product to be granted to the first customer.

14. The system of claim 13, wherein the product comprises at least one of a ship-based entertainment or dining event, a shore excursion, a food or beverage item, and a retail item.

15. The system of claim 5, further comprising a plurality of passive monitoring devices located at least partially in public areas of the cruise ship, each of the passive monitoring devices comprising an image capture device and a networking device configured to communicate with the ship-based network, wherein the processor is further configured to:
- receive, from the plurality of passive monitoring devices, images captured by the image capture devices of the passive monitoring devices;
- detect, based on the one or more facial recognition software algorithms and the preexisting facial recognition data, one or more second customers in the images received from the plurality of passive monitoring devices; and
- update, in the data store, location tracking information associated with the one or more second customers.

16. A facial recognition-based embarkation and disembarkation system for a cruise ship, the system comprising:
- a data store on the cruise ship having stored thereon a plurality of customer profiles associated with individual customers expected to embark on the cruise ship, the data store in communication with a ship-based network;
- an embarkation device in communication with the data store, the embarkation device comprising an image capture device and a networking device configured to communicate with the ship-based network; and
- a processor in communication with the data store and the embarkation device, the processor configured to:
  - receive, from the embarkation device, an image and an identifier of a first customer expected to embark on the cruise ship;
  - establish, in a customer profile of the plurality of customer profiles associated with the first customer, facial recognition data associated with the first customer, the facial recognition data comprising at least the image;
  - record, in the customer profile, a confirmation of embarkation of the first customer;
  - generate, based on one or more facial recognition software algorithms and the facial recognition data, facial recognition results indicating that an image received from a networked computing device on the cruise ship is an image of the first customer, each facial recognition result including a result strength value indicative of a confidence level of the facial recognition result;
  - adjust the result strength values of the facial recognition results based on one or more other information items stored in the data store in association with the first customer, the one or more other information items comprising one or more of other customers associated with the first customer, itinerary information, one or more previous facial recognition results, a predicted location, or a detection of a user device of the first customer near the networked computing device; and cause one or more products to be provided to the first customer based at least in part on the facial recognition results and based at least in part on the result strength value exceeding a predetermined threshold.

17. The system of claim 16, wherein the plurality of customer profiles associated with individual customers are developed based on information provided by individual customers at a time of booking a sailing on the cruise ship, while developing a cruise itinerary for the sailing, and/or during a prior sailing on which the individual customer embarked.

18. The system of claim 16, wherein the one or more products comprise at least one of ship-based activities, an entertainment event, a dining event, shore-based activities, a shore excursion, food or beverage items, or retail items.

19. The system of claim 16, wherein the processor is further configured provide access to a stateroom associated with the first customer based at least in part on the facial recognition results.

20. The system of claim 16, wherein the processor is further configured to record one or more subsequent departure or return events associated with the first customer based at least in part on the facial recognition results.

21. The system of claim 16, wherein the processor is further configured to:

receive, from the first customer, a request for an item to be delivered to the customer while the customer is aboard the cruise ship; and provide, to a crew member delivering the requested item, one or more visual notifications on a crew device in the possession of the crew member while the crew member is traveling to the first customer, wherein the one or more visual notifications are based at least in part on at least some of the facial recognition results and facilitate delivery of the item to the customer.

22. The system of claim 19, wherein the one or more products comprise an activity requiring the customer to provide an acknowledgement of risk prior to participation, and wherein causing the one or more products to be provided comprises at least:

receiving a video of the first customer speaking a risk acknowledgement statement;

verifying the identity of the first customer based on one or more image frames of the video; and causing the first customer to be permitted to participate in the activity based on the verification of the identity of the first customer.

23. A system for identifying customers embarked on a cruise ship, the system comprising:

a data store on the cruise ship having stored thereon a plurality of customer profiles associated with individual customers embarked on the cruise ship, the data store in communication with a ship-based network;

a plurality of networked computing devices located at least partially in public areas of the cruise ship, each of the networked computing devices comprising an image capture device and a networking device configured to communicate with the ship-based network; and a processor in communication with the data store and the plurality of networked computing devices, the processor configured to:

receive, from a first device of the plurality of networked computing devices, a first request for access to a product or location associated with at least a first customer;

receive, from the first device, an image of a requestor associated with the request;

generate, based on one or more facial recognition software algorithms and preexisting facial recognition data associated with the first customer stored in the data store, a facial recognition result indicating that the image of the requestor is an image of the first customer, the facial recognition result including a result strength value indicative of a confidence level of the facial recognition result;

adjust the result strength value based on one or more other information items stored in the data store in association with the first customer, the one or more other information items comprising one or more of other customers associated with the first customer, itinerary information, one or more previous facial recognition results, a predicted location, or a detection of a user device of the first customer near the requestor's location; and cause access to the product or location to be granted to the first customer, based at least in part on the facial recognition result and based at least in part on the result strength value exceeding a predetermined threshold.

24. The system of claim 23, wherein the processor is configured to selected the predetermined threshold from at least a first predetermined threshold and a second predetermined threshold higher than the first predetermined threshold.

25. The system of claim 23, wherein the first device comprises a video capture device, and wherein the first device is configured to capture a video of the requestor and to send the video to the processor.

26. The system of claim 25, wherein the processor is configured to isolate a frame of the video for facial recognition, and wherein the image of the requestor comprises the isolated frame of the video.

27. The system of claim 23, wherein access to the product or location is granted based at least in part on a customer profile stored in the data store and associated with the first customer.

28. The system of claim 27, wherein the customer profile is selected from a plurality of stored customer profiles based on the facial recognition result.

29. The system of claim 27, wherein the processor is further configured to determine, based on the customer profile, that the first customer is entitled to access to the requested product or location.

* * * * *